(12) United States Patent
Pei

(10) Patent No.: US 11,147,378 B2
(45) Date of Patent: Oct. 19, 2021

(54) DISPLAY MOUNTING APPARATUS

(71) Applicant: Xuan Pei, Shenzhen (CN)

(72) Inventor: Xubo Pei, Shenzhen (CN)

(73) Assignee: Xuan Pei, Shenzhen (CN)

( * ) Notice: Subject to any disclaimer, the term of this patent is extended or adjusted under 35 U.S.C. 154(b) by 119 days.

(21) Appl. No.: 16/808,787

(22) Filed: Mar. 4, 2020

(65) Prior Publication Data

US 2021/0244186 A1 Aug. 12, 2021

(30) Foreign Application Priority Data

Feb. 7, 2020 (CN) .................... CN202020157346.3

(51) Int. Cl.
*F16M 11/00* (2006.01)
*A47B 97/00* (2006.01)
*F16M 13/02* (2006.01)

(52) U.S. Cl.
CPC ........... *A47B 97/00* (2013.01); *F16M 13/022* (2013.01); *A47B 2097/006* (2013.01); *F16M 2200/021* (2013.01)

(58) Field of Classification Search
CPC ...... F16M 13/022; F16M 13/00; F16M 11/04; F16M 11/00; A47B 97/00; F16B 2/12
See application file for complete search history.

(56) References Cited

U.S. PATENT DOCUMENTS

| | | | |
|---|---|---|---|
| 4,621,782 A | 11/1986 | Carlson et al. | |
| 6,443,408 B1 * | 9/2002 | Hung | F16M 11/105 248/130 |
| 7,424,994 B2 * | 9/2008 | Jeong | F16M 11/105 248/278.1 |
| 7,593,218 B2 * | 9/2009 | Hwang | F16M 11/105 248/917 |
| 7,798,457 B2 * | 9/2010 | Chih | F16M 11/10 248/284.1 |
| 9,316,346 B2 * | 4/2016 | Lau | F16M 13/022 |
| 9,829,151 B1 | 11/2017 | Stenhouse | |
| 2006/0186295 A1 | 8/2006 | Dittmer et al. | |

(Continued)

FOREIGN PATENT DOCUMENTS

CN 1229984 C 11/2005

OTHER PUBLICATIONS

The European Search Report issued in corresponding EP Application No. EP20160274.5 dated Oct. 5, 2020.

*Primary Examiner* — Amy J. Sterling
(74) *Attorney, Agent, or Firm* — Dinsmore & Shohl LLP

(57) ABSTRACT

The present disclosure discloses a display mounting apparatus, including a rotating base and a rotating support. The rotating base includes a base and at least one base bearing. The base defines a base shaft hole. The base bearing is engaged with the base shaft hole and is coaxial with the shaft hole. The rotating support includes a rotating disc, a first bearing sleeve and a second bearing sleeve. The rotating disc is used to fix the display. The rotating disc defines a disc shaft hole. The first bearing sleeve includes a disc fixed ring and a hollow shaft coaxial with the disc fixed ring. The disc fixed ring is fixedly coupled to the rotating disc, and is coaxial with the disc shaft hole. The hollow shaft passes through the disc shaft hole, at least one base bearing and the base shaft hole, and is engaged with least one base bearing.

20 Claims, 14 Drawing Sheets

(56) References Cited

U.S. PATENT DOCUMENTS

| | | | |
|---|---|---|---|
| 2007/0210221 A1* | 9/2007 | Kim | F16M 11/2064 |
| | | | 248/124.1 |
| 2019/0200762 A1 | 7/2019 | Wang et al. | |
| 2019/0301670 A1* | 10/2019 | Glickstein | F16M 13/022 |

* cited by examiner

DISPLAY MOUNTING APPARATUS

CROSS-REFERENCE TO RELATED APPLICATIONS

This application claims the benefit of Chinese Patent Application CN2020201573463 filed Feb. 7, 2020, the contents of which are hereby incorporated in their entirety

TECHNICAL FIELD

The present disclosure relates to technical fields of mounting equipment, and in particular, to a display mounting apparatus.

BACKGROUND

At present, the display mounting apparatus needs to use a rotating disc to drive a display to display in a horizontal display state or a vertical display state. However, under normal circumstances, during a rotation of the rotating disc relative to a base, the rotating disc is easily affected by the gravity of the display, which makes the rotation between the rotating disc and the base poorly, and further makes the rotation between the rotating disc and the base not smoothly, which causes an angle of the display to be adjusted unevenly.

SUMMARY

In view of the detects of the prior art, the present disclosure provides a display mounting apparatus to cure above defects.

The present disclosure provides a display mounting apparatus. The display mounting apparatus includes a rotating base and a rotating support. The rotating base includes a base and at least one base bearing. The base defines a base shaft hole, and the base bearing is adapted to the base shaft hole, and is coaxial with the shaft hole. The rotating support includes a rotating disc, a first bearing sleeve and a second bearing sleeve. The base is used to fix the display. The rotating disc defines a disc shaft hole. The first bearing sleeve includes a disc fixed ring and a hollow shaft coaxial with the disc fixed ring and extending from an inside of the disc fixed ring. The disc fixed ring is fixedly coupled to the rotating disc, and is coaxial with the disc shaft hole. The hollow shaft passes through the disc shaft hole, the at least one base bearing and the base shaft hole. The hollow shaft is adapted to the at least one base bearing. The second bearing sleeve is fixed to one end of the hollow shaft passing through the base shaft hole. The second bearing sleeve and the disc fixed ring cooperatively apply clamping force in a direction parallel to an axial direction of the hollow shaft to the at least one base bearing.

In the display mounting apparatus of the present disclosure, the first bearing sleeve includes a disc fixed ring fixed to the rotating disc and a hollow shaft passing through the disc shaft hole, and the second bearing sleeve is fixed to one end of the hollow shaft away from the disc fixed ring. The second bearing sleeve and the disc fixed ring cooperatively clamp the at least one base bearing. The at least one base bearing engages with the hollow shaft, so that the rotating support and the rotating base engage tightly; to improve a rotation stability of the rotating disc relative to the base; and the smoothness of the rotation support and rotating base, so that the rotating base can drive the display to adjust its angle.

BRIEF DESCRIPTION OF THE ACCOMPANYING DRAWINGS

In order to explain the technical solutions in the embodiments of the present disclosure more clearly, the drawings used in the embodiments will be briefly introduced below. Obviously, the drawings in the following description are only some embodiments of the present disclosure. Those of ordinary skill in the art can also obtain other obvious deformation modes according to these drawings without paying creative labor.

DETAILED DESCRIPTION OF ILLUSTRATED EMBODIMENTS

The technical solutions in the embodiments of the present disclosure are clearly and completely described in the following with reference to the drawings in the embodiments of the present disclosure. It is obvious that the described embodiments are only a part of the embodiments of the present disclosure, and not all of the embodiments. All other embodiments obtained by a person of ordinary skill in the art based on the embodiments of the present disclosure without departing from the inventive scope are the scope of the present disclosure.

It should be noted that when a component is called "fixed to" another component, it may be directly on another component or a centered component may exist. When a component is considered to be "coupled" to another component, it can be directly coupled to another component or a centered component may exist at the same time.

Unless defined otherwise, all technical and scientific terms used herein have the same meaning as commonly understood by one of ordinary skill in the art to which this invention belongs. The terms used herein in the description of the present utility model are only for the purpose of describing specific embodiments, and are not intended to limit the present disclosure. The term "and/or" as used herein includes any and all combinations of one or more of the associated listed items.

Hereinafter, some embodiments of the present disclosure will be described in detail with reference to the drawings. In the case of no conflict, the following embodiments and features in the embodiments can be combined with each other.

Figure 1:
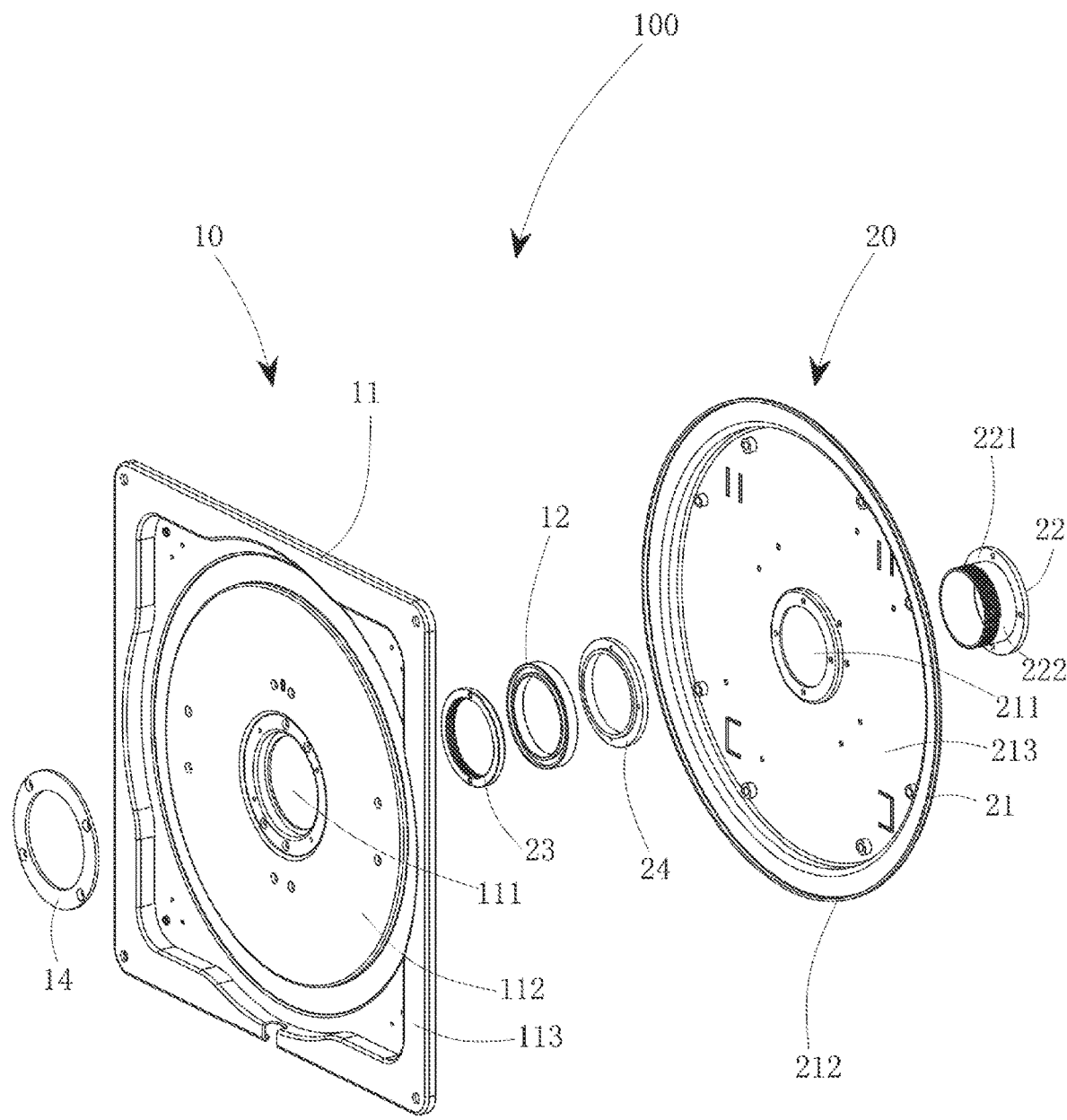
FIG. 1 is an exploded view of a display mounting apparatus provided by the present disclosure.
Figure 2:
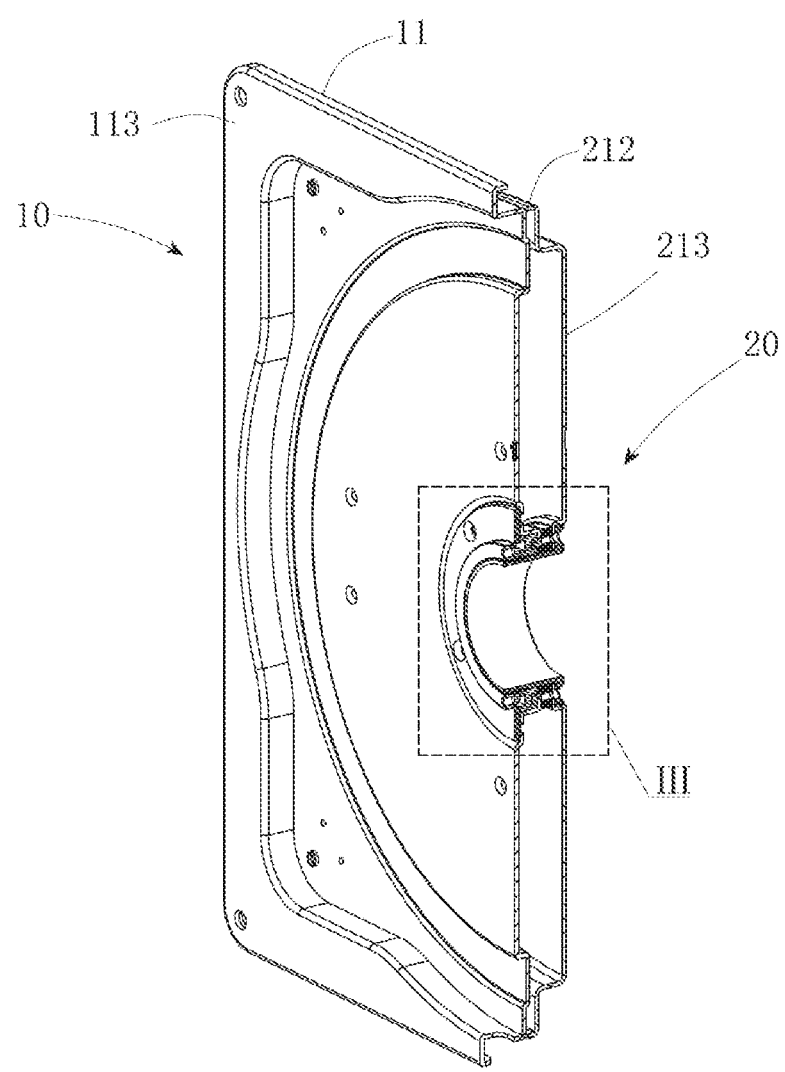
FIG. 2 is a cross-sectional view of a display mounting apparatus provided by the present disclosure.
Figure 3:
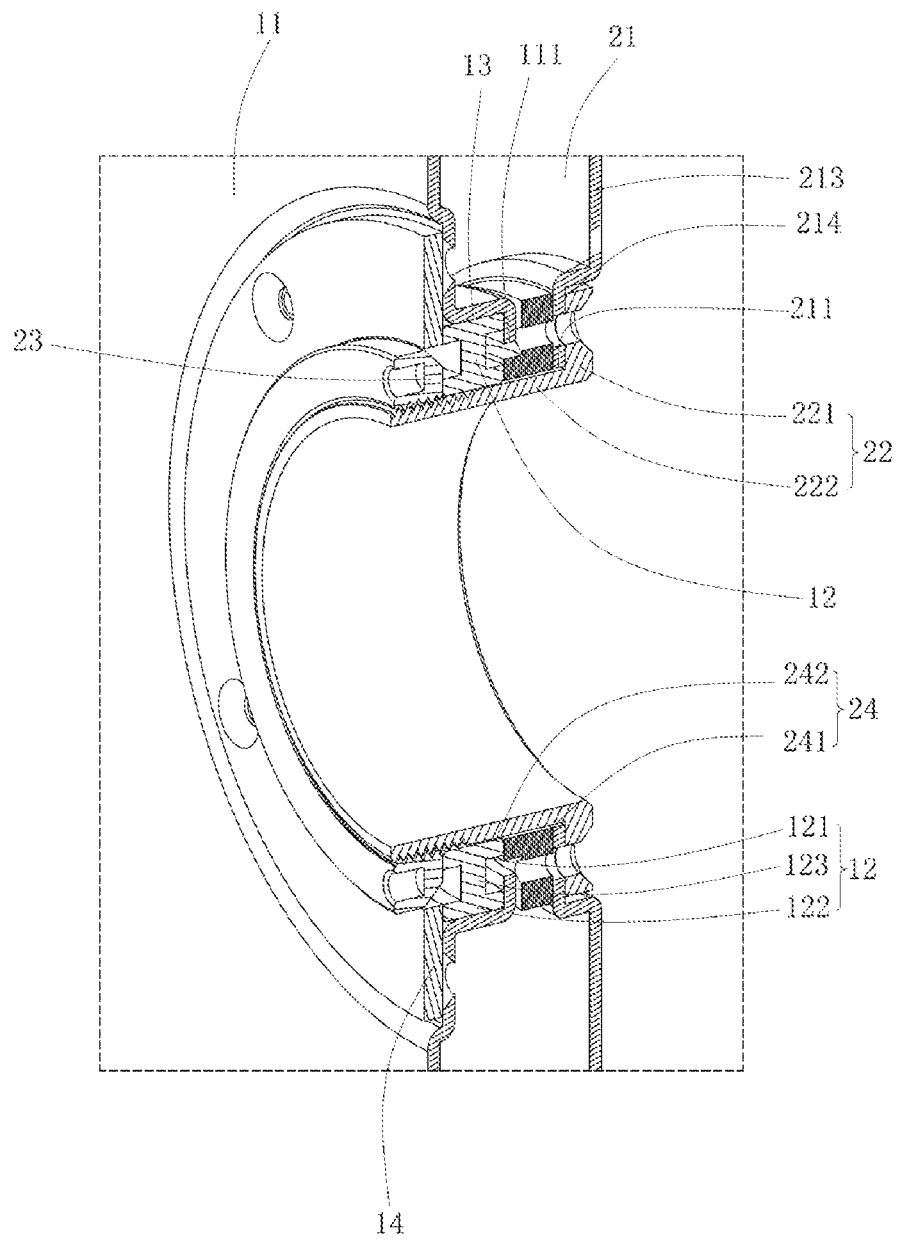
FIG. 3 is an enlarged schematic view of a part III of the display mounting apparatus of FIG. 2.

Referring to FIG. 1, FIG. 2 and FIG. 3, the present disclosure provides a display mounting apparatus 100. The display mounting apparatus 100 includes a rotating base 10 and a rotating support 20. The rotating base 10 includes a base 11 and at least one base bearing 12. The base 11 defines a base shaft hole 111. The base bearing 12 is adapted to the base shaft hole 111 and is coaxial with the base shaft hole 111. The rotating support 20 includes a rotating disc 21, a first bearing sleeve 22, and a second bearing sleeve 23. The base 11 is used for fixing a display. The rotating disc 21 defines a disc shaft hole 211. The first bearing sleeve 22 includes a disc fixed ring 221 and a hollow shaft 222 coaxial with the disc fixed ring 221 and extending from an inside of the disc fixed ring 221. The disc fixed ring 221 is fixedly coupled to the rotating disc 21 and is coaxial with the disc shaft hole 211. The hollow shaft 222 passes through the disc shaft hole 211, the at least one base bearing 12, and the base shaft hole 111. The hollow shaft 222 is adapted to the at least one base bearing 12. The second bearing sleeve 23 is fixed to one end of the hollow shaft 222 passing through the base shaft hole 111, and the second bearing sleeve 23 and the disc fixed ring 221 cooperatively apply clamping force in a direction parallel to an axial direction of the hollow shaft 222 to the at least one base bearing 12.

It can be understood that the base 11 can be used to mount the display. Particularly, the display is a commercial display (for example, a media player display used in an office, an information display used in ultrasound, an advertisement display used in a large shopping mall, etc.), and the display may also be an electronic device with display functions, such as a flat-screen TV, a liquid crystal display, a tablet computer, a display terminal, and so on. The display can be rotated with the base 11 relative to the rotating support 20, so that the display can be in a horizontal screen state or a vertical screen state to meet different display scenarios.

Therefore, the first bearing sleeve 22 includes a disc fixed ring 221 fixed to the rotating disc 21 and a hollow shaft 222 passing through the disc shaft hole 211, The second bearing sleeve 23 is fixed to one end of the hollow shaft 222 away from the disc fixed ring 221. The second bearing sleeve 23 and the disc fixed ring 221 cooperatively clamp the at least one base bearing 12, The at least one base bearing 12 engages with the hollow shaft 222, so that the rotating support 20 and the rotating base 10 are rotated tightly to improve rotation stability of the rotating disc 21 relative to the base 11, and further improve the smoothness of the rotation support 20 and the rotating base 10, it is convenient for the rotating base 10 to drive the display to adjust the angle.

In this embodiment, one side of the base 11 away from the rotating disc 21 can be a back side of the display. The base 11 includes a support disc 112 and a stable perimeter 113 extending from a periphery of the support disc 112. The stable perimeter 113 is in a shape of a rectangular plate. The support disc 112 forms a circular boss of the stable perimeter 113. The base shaft hole 111 is defined in the support disc 112. The base shaft hole 111 is a circular hole. A central axis of the base shaft hole 111 is coaxial with a central axis of the support disc 112. One side of the support disc 112 away from the stable perimeter 113 is engaged with the rotating disc 21. The base 11 is made of steel materials. The base 11 is formed by a die-casting molding process. The stable perimeter 113 and the support disc 112 are made of same materials.

More specifically, the stable perimeter 113 has four corners, and each of the four corners defines a fixing screw hole. The fixing screw hole is used for firmly connecting the display with a screw. Of course, in other embodiments, the base 11 may also have a disc shape. The stable perimeter 113 has a ring shape extending along a periphery of the support disc 112.

In this embodiment, the rotating base 10 includes one base bearing 12. The central axis of the base bearing 12 is coaxial with the central axis of the base shaft hole 111. An inner wall of the base bearing 12 and an outer wall of the hollow shaft 222 are rotatably engaged with each other. An outer portion of the base bearing 12 is roughly stacked with a peripheral side of the base shaft hole 111 of the support disc 112, and an inner portion of the base bearing 12 is convex relative to the inner wall of the base shaft hole 111, to facilitate the inner portion of the base bearing 12 rotatably engaging with the hollow shaft 222. By utilizing the processing precision of the base bearing 12, the rotation coordination stability of the base bearing 12 and the hollow shaft 222 is improved. One end of the base bearing 12 away from the disc fixed ring is subject to a locking effect of the second bearing sleeve 23 and the hollow shaft 222, and is in contact with the second bearing sleeve 23 tightly, and is rotatably engaged with one end of the base bearing 12 close to the second bearing sleeve 23. One end of the base bearing 12 away from the second bearing sleeve 23 is in contact with one surface of the support disc 112 away from the rotating disc 21, and the base bearing 12 is firmly coupled to the support disc 112, By using the base bearing 12 to be restricted in a direction parallel to the hollow shaft 222 and a direction perpendicular to the hollow shaft 222, the stability of the base bearing 12 is improved, and the stability of the rotation fit of the hollow shaft 222 and the base bearing 12 is stable to avoid shaking of the rotating disc 21 relative to the base 11.

In other embodiments, the rotating base 10 may also include a plurality of the base bearings 12. The plurality of the base bearings 12 are arranged side by side in a direction parallel to the central axis of the base shaft hole 111. The adjacent two base bearings 12 are in contact with each other tightly to ensure a connection stability of the plurality of base bearings 12 and the support disc 112. One of the plurality of the base bearings 12 which is away from the disc fixed ring 221 is subject to a locking effect of the second bearing sleeve 23 and the hollow shaft 222, such that the base bearing 12 away from the disc fixed ring 221 and the second bearing sleeve 23 are in close to contact with each other and further rotate to engage with each other. The base bearing 12 close to the disc fixed ring 221 is in close to contact with one side of the support disc 112 away from the rotating disc 21. The base bearing 12 close to the disc fixed ring 221 is firmly coupled to the support disc 112. The plurality of base bearings 12 are firmly coupled. By using the plurality of the base bearings 12 arranged side by side, a rotation mating area of the rotating base 10 and the hollow shaft 222 is increased, and a stability of the two ends of the hollow shaft 222 is improved, preventing the hollow shaft 222 from sliding relative to the plurality of base bearings 12.

In this embodiment, the rotating disc 21 is in a shape of disc. One surface of the rotating disc 21 away from the base 11 is used to be fixed on a wall, or on a post, or on a cabinet of a decorative cabinet, so that the rotating disc 21 can stably carry the base 11. An outer diameter of the rotating disc 21 is substantially the same as an outer diameter of the support disc 112. A peripheral edge of the rotating disc 21 includes a bent edge 212 bent toward the support disc 112. The bent edge 212 and the support disc 112 are clearance fit, causing a distance between a part of the rotating disc 21 having the disc shaft hole 211 and a part of the rotating disc 21 for securely connecting the display to increase, to ensure that the part of the rotating disc 21 securely engaging with the hollow shaft 222 is adjacent to one end of the hollow shaft 222 coupled to the disc fixed ring 221. The rotating disc 21 includes a disc-shaped protrusion 213 protruding in a direction away from the support disc 112. One side of the rotating disc 21 close to the support disc 112 forms a recessed space corresponding to the disc-shaped protrusion 213. The recessed space can increase the distance between the rotating disc 21 and the support disc 112, thereby facilitating the rotating disc 21 and the support disc 112 to support both ends of the hollow shaft 222, to increase the rotational stability of the hollow shaft 222. Specifically, one side of the disc-shaped protrusion 213 away from the support disc 112 defines a recessed groove 214 facing the support disc 112. The disc shaft hole 211 cuts off the rotating disc 21 from a bottom of the recessed groove 214. The disc fixed ring 221 is fixed in the recessed groove 214 to increase the stability of the disc fixed ring 221 and the rotating disc 21. A peripheral side wall of the disc fixed ring 221 is clearance fit with an inner side wall of the recessed groove 214. The end surface of the disc fixed ring 221 away from the base 11 is substantially flush with the end surface of the disc-shaped protrusion 213, to ensure that the rotating disc 21 and the disc fixed ring 221 provide a flat surface, which is convenient for the display to be stably installed on the rotating disc 21.

In this embodiment, the rotating disc 21 has a plurality of bearing screw holes arranged at equal intervals along a periphery of the disc shaft hole 211 at a bottom of the recessed groove 214. The disc fixed ring 221 is securely coupled to the bearing screw holes through the bearing screw holes, and further limits the first bearing sleeve 22 to be stationary and fixed relative to the rotating disc 21. The disc fixed ring 221 and the rotating disc 21 may also be firmly coupled by pins. The second bearing sleeve 23 is screwed with one end of the hollow shaft 222 passing through the base shaft hole 111. By controlling a locking degree of the second bearing sleeve 23 and the hollow shaft 222, the second bearing sleeve 23 can tightly contact the base bearing 12, and the tightness of the rotation fit between the base bearing 12 and the second bearing sleeve 23 is improved.

Furthermore, the rotating support 20 further includes a spacer 24 fixedly coupled to the rotating disc 21 and coaxially disposed with the disc shaft hole 211, and the spacer 24 and the base bearing 12 are rotatably tightly engaged with each other.

In this embodiment, the spacer 24 is located on one side of the rotating disc 21 close to the base 11. The spacer 24 and the disc fixed ring 221 cooperatively clamp a portion of the rotating disc 21 located on an outer peripheral edge of the disc shaft hole 211. Specifically, the screws that pass through the bearing screw holes also pass through the spacer 24 so that the spacer 24 is fixed to the rotating disc 21.

Specifically, the spacer 24 includes a fixing portion 241 firmly coupled to the rotating disc 21 and a convex fitting portion 242 disposed on a side of the fixing portion 241 away from the rotating disc 21. The fixing portion 241 is firmly coupled to a screw passing through the bearing screw hole. An end surface of the convex fitting portion 242 away from the rotating disc 21 is tightly engaged with the base bearing 12 and is rotatably engaged with the base bearing 12 to restrict the base bearing 12 to move axially along the hollow shaft 222. An inner diameter of the spacer 24 is greater than an outer diameter of the hollow shaft 222, preventing the spacer 24 from interfering with the rotation of the hollow shaft 222, and ensuring rotation smoothness of the hollow shaft 222 and the base bearing 12.

Furthermore, one side of the base 11 away from the rotating disc 21 defines a sink groove 13 that sinks toward the rotating disc 21 along the peripheral side of the base shaft hole 111. The bottom of the at least one base bearing 12 is fixed to inside of the sink groove 13. The rotating base 10 further includes a bearing pressing piece 14 fixed to the rotating disc 21. The bearing pressing piece 14 covers one side of the bottom of the base bearing 12 away from the bottom of the sink groove 13.

In this embodiment, the base shaft hole 111 penetrates the base 11 from the bottom of the sink groove 13. The outer portion of the base bearing 12 forms a bottom of the base bearing 12. The outer peripheral side of the base bearing 12 is tightly engaged with the inner peripheral side of the sink groove 13, and the side of the base bearing 12 close to the rotating disc 21 is in close to contact with the bottom of the sink groove 13 to ensure that the stability of the base bearing 12 and the base 11. The base bearing 12 presses against the sink groove 13 by using the bearing pressing piece 14 to prevent the base bearing 12 from shaking relative to the base 11. The rotating disc 21 defines a groove adapted to the bearing pressing piece 14. The groove is located on the outer peripheral side of an open end of the sink groove 13. The bearing pressing piece 14 can be fixed to the groove by screws. An inner portion of the bearing pressing piece 14 is convex relative to an inner peripheral wall of the sink groove 13, and covers the base bearing 12. The inner side of the bearing pressing piece 14 is tightly engaged with the side of the base bearing 12 away from the rotating disc 21. The inner portion of the bearing pressing piece 14 covers the outer portion of the base bearing 12 so that the second bearing sleeve 23 can be tightly engaged with the inner portion of the base bearing 12. The second bearing sleeve 23 partially passes through the through hole of the bearing pressing piece 14. The second bearing sleeve 23 is separated from the bearing pressing piece 14 to prevent the bearing pressing piece 14 from interfering with the rotation of the second bearing sleeve 23. The bearing pressing piece 14 and the second bearing approximately cover the base bearing 12 to prevent impurities from being mixed between the base bearing 12 and the hollow shaft 222, and ensure rotation smoothness of the hollow shaft 222 and the base bearing 12.

Furthermore, the top of the at least one base bearing 12 exposes the sink groove 13 and is clamped between the second bearing sleeve 23 and the spacer 24, and is rotatably matched with the second bearing sleeve 23, the spacer 24 and the hollow shaft 222.

In this embodiment, an inner portion of the base bearing 12 close to the hollow shaft 222 forms a top of the base bearing 12. An inner portion of the base bearing 12 is convex relative to an inner peripheral wall of the base shaft hole 111. The inner portion of the base bearing 12 is close to the hollow shaft 222 relative to the base shaft hole 111, to ensure that there is a gap between the base shaft hole 111 and the hollow shaft 222, so that the convex fitting portion 242 of the spacer 24 is located within the gap, and tightly engage with one side of the base bearing 12 close to the rotating disc 21, limit an axial movement of the base bearing 12 to move along an axis parallel to the hollow shaft 222, and limit a plane movement of the base bearing 12 to move along a plane perpendicular to the hollow shaft 222, so as to ensure the rotation stability of the base bearing 12 and the hollow shaft 222. The spacer 24 and a portion of the base 11 on the peripheral side of the base shaft hole 111 are stacked, so that the rotating support 20 and the rotating base 10 are compact in structure. The spacer 24 is separated from the base 11 to prevent the spacer 24 and the base 11 from generating rotation resistance with each other.

Specifically, the base bearing 12 includes a first beam 121 close to the hollow shaft 222 and a second beam 122 away from the hollow shaft 222, and a vertical beam 123 coupled between the first beam 121 and the second beam 122, The cross-section of the base bearing 12 is generally in a shape of "工", so that the weight of the base bearing 12 is reduced, the display mounting apparatus 100 is facilitated to be mounted, and the display mounting apparatus 100 is conveniently moved. The base bearing 12 is used to reduce the weight of the base bearing 12 to prevent a center axis of the base bearing 12 from being offset from the center axis of the base shaft hole 111 by the gravity, thereby increasing the stability of the base bearing 12 and the base 11. An inner peripheral side surface of the first beam 121 and an outer peripheral side surface of the hollow shaft 222 are rotationally fitted. Both end surfaces of the first beam 121 are rotationally matched with the second bearing sleeve 23 and the spacer 24, respectively. The outer peripheral side surface of the second beam 122 and the inner peripheral side surface of the sink groove 13 are tightly and firmly matched, and the two end surfaces of the second beam 122 are tightly and firmly coupled to the bearing pressing piece 14 and the bottom of the sink groove 13, respectively.

Figure 4:
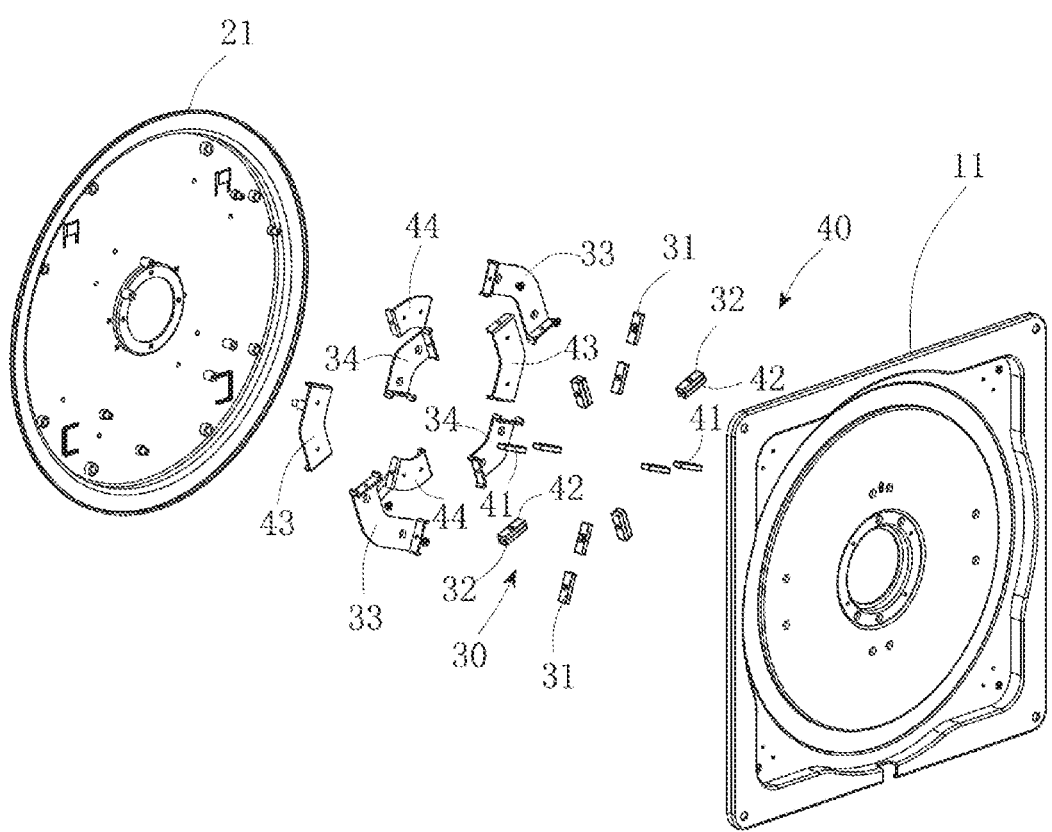
FIG. 4 is another exploded view of a display mounting apparatus provided by the present disclosure.
Figure 5:
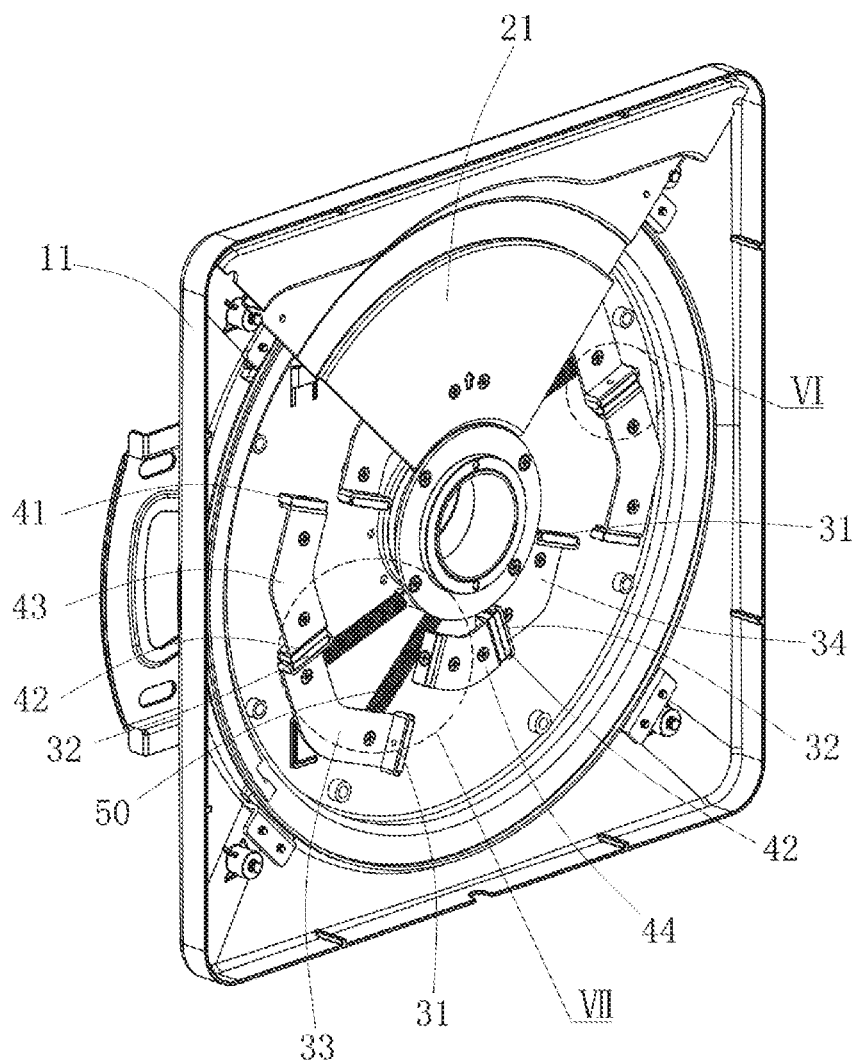
FIG. 5 is a partial cross-sectional view of a display mounting apparatus provided by the present disclosure.
Figure 6:
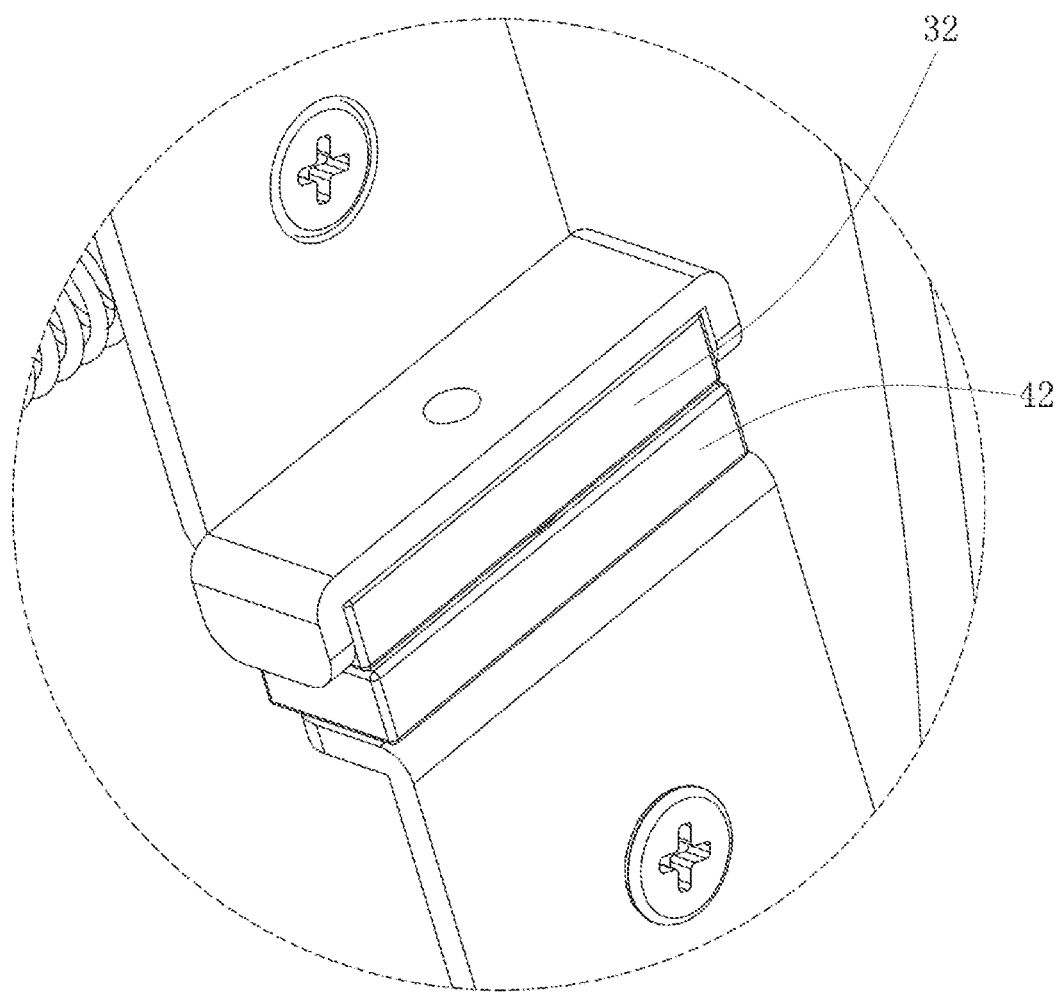
FIG. 6 is an enlarged schematic view of a circle VI of the display mounting apparatus of FIG. 5.

Furthermore, referring to FIG. 4, FIG. 5 and FIG. 6, the display mounting apparatus 100 includes a first magnetic assembly 30 fixed to one side of the base 11 facing the rotating disc 21 and a second magnetic assembly 40 fixed to one side of the rotating disc 21 facing the base 11. The first magnetic assembly 30 and the second magnetic assembly 40 are magnetically matched to position the base 11 and the rotating disc 21 and keep the display in a horizontal screen state or a vertical screen state.

In this embodiment, the first magnetic assembly 30 and the second magnetic assembly 40 can be mutually stabilized by magnetic force, thereby making the base 11 and the rotating disc 21 mutually stable, to keep the rotating disc 21 stationary at a predetermined position relative to the base 11. It can be understood that the rotating disc 21 can be stationary and stable relative to the base 11 under the magnetic attraction force of the first magnetic assembly 30 and the second magnetic assembly 40. When the display is in the horizontal screen state, the rotating disc 21 rotates to a preset position relative to the base 11, and a portion of the first magnetic assembly 30 and a portion of the second magnetic assembly 40 are magnetically matched to make the rotating disc 21 and the base 11 stable so that the display can be maintained in the horizontal screen state for display. When the rotating disc 21 is rotated to another position relative to the base 11, a part of the first magnetic assembly 30 is separated from a part of the second magnetic assembly 40, and another part of the first magnetic assembly 30 is moved to be magnetically matched to another part of the second magnetic assembly 40, the display is in the vertical screen state, and the rotating disc 21 is stable relative to the base 11 under the magnetic force of another part of the first magnetic assembly 30 and another part of the second magnetic assembly 40, so that the display can be displayed in the vertical screen state. By using the magnetic force of the first magnetic assembly 30 and the second magnetic assembly 40, the rotating disc 21 is relatively stable with respect to the base 11 and increases the positioning and stable performance of the display mounting apparatus 100.

Furthermore, the first magnetic assembly 30 includes first vertical screen magnets 31 and first horizontal screen magnets 32 separated from the first vertical screen magnets 31. The first vertical screen magnets 31 and the first horizontal screen magnets 32 are fixed to the rotating disc 21. The second magnetic assembly 40 includes second vertical screen magnets 41 and second horizontal screen magnets 42 adjacent to the second vertical screen magnets 41. The second vertical screen magnets 41 and the second horizontal screen magnets 42 follow the rotating disc 21 to rotate around the hollow shaft 222 between the first vertical screen magnets 31 and the first horizontal screen magnets 32, and when the first horizontal screen magnets 32 and the second horizontal screen magnets 42 are magnetically attracted, the display is positioned in the horizontal screen state, and when the first vertical screen magnets 31 and the second vertical screen magnets 41 are magnetically attracted, the display is in the vertical screen state.

In this embodiment, the first vertical screen magnets 31 and the first horizontal screen magnets 32 are fixed on a side of the rotating disc 21 facing the base 11. The first vertical screen magnets 31 and the second horizontal screen magnets 42 are located in a space staggered between the rotating disc 21 and the recessed groove 214, to make full use of the accommodation space between the rotating disc 21 and the base 11. An angle between a connection line of central axis of the first vertical screen magnets 31 and the disc shaft hole 211 and a connection line of central axis of the first horizontal screen magnets 32 and the disc shaft hole 211 is greater than 90°, which is convenient for the display to be rotated from the vertical screen state to the horizontal screen state when the rotating disc 21 rotates approximately 90°. The second vertical screen magnets 41 and the second horizontal screen magnets 42 are fixed to one side of the base 11 facing the rotating disc 21. The second vertical screen magnets 41 and the second horizontal screen magnets 42 are located in a space staggered between the base 11, the groove and the bearing grooves, to make full use of the accommodation space between the base 11 and the rotating disc 21. The second vertical screen magnets 41 and the second horizontal screen magnets 42 are adjacent to each other. An angle between a connection line of the central axis of the second vertical screen magnets 41 and the base shaft hole 111, and a connection line of the central axis of the second horizontal screen magnets 42 and the base shaft hole 111 is less than 90°. When the first vertical screen magnets 31 and the second vertical screen magnets 41 are magnetically matched, the first horizontal screen magnets 32 and the second horizontal screen magnets 42 are separated, and the rotation angle between the first horizontal screen magnets 32 and the second horizontal screen magnets 42 is approximately 90°. Similarly, when the first horizontal screen magnets 32 and the second horizontal screen magnets 42 are magnetically coupled, the first vertical screen magnets 31 is separated from the second vertical screen magnets 41, and the rotation angle between the first vertical screen magnets 31 and the second vertical screen magnets 41 is approximately 90°. The rotating disc 21 may stabilize a plurality of first vertical screen magnets 31 and a plurality of first horizontal screen magnets 32, and the base 11 may stabilize a plurality of second vertical screen magnets 41 and a plurality of the second horizontal screen magnets 42 to increase the magnetic attraction strength of the rotating disc 21 and the base 11.

Specifically, a direction of magnetic force of the first vertical screen magnets 31, a direction of magnetic force of the second vertical screen magnets 41, a direction of magnetic force of the first horizontal screen magnets 32, and a direction of magnetic force of the second horizontal screen magnets 42 are all parallel to a rotating surface of the rotating disc 21 and are perpendicular to the radial direction of the hollow shaft 222, such that when the first magnetic assembly 30 and the second magnetic assembly 40 are magnetically matched, the rotating disc 21 and the base 11 are subjected to a maximum magnetic damping force, and the rotating disc 21 is restricted from rotating relative to the base 11.

Furthermore; the first magnetic assembly 30 includes two first outer magnetic brackets 33 that are symmetrically arranged around the base shaft hole 111, and opposite ends of each of the first outer magnetic brackets 33 respectively fix the first vertical screen magnets 31 and the first horizontal screen magnets 32. The second magnetic assembly 40 includes two second outer magnetic brackets 43 symmetrically disposed around the disc shaft hole 211. Each second outer magnetic bracket 43 rotates back and forth around the hollow shaft 222 between the two first outer magnetic brackets 33. The opposite two ends of each second outer magnetic bracket 43 respectively fix the second vertical screen magnets 41 and the second horizontal screen magnets 42.

In this embodiment, the first outer magnetic bracket 33 is fixed on a side of the rotating disc 21 facing the base 11 and is located away from the disc shaft hole 211. The first outer magnetic bracket 33 is a bent steel plate. One part between two ends of the first outer magnetic bracket 33 engages with the rotating disc 21. The two ends of each first outer magnetic bracket 33 are bent toward the base 11 and respectively defines two stable grooves. One first vertical screen magnet 31 and one first horizontal screen magnet 32 are respectively received in the two stable grooves. End surfaces of the first vertical screen magnet 31 and the first horizontal screen magnet 32 may expose the stable grooves to facilitate the first vertical screen magnet 31 and the first horizontal screen magnet 32 to magnetically match with the second vertical screen magnet 41 and the second horizontal screen magnet 42 respectively. The structure of the second outer magnetic bracket 43 is substantially the same as the structure of the first outer magnetic bracket 33. The difference is that one part of the second outer magnetic bracket 43 between the two ends of the second outer magnetic bracket 43 fits the base 11 and the specific structure of the second outer magnetic bracket 43 is not repeated here. The first outer magnetic bracket 33 is used to stabilize the first vertical screen magnet 31 and the first horizontal screen magnet 32, and the second outer magnetic bracket 43 is used to stabilize the second vertical screen magnet 41 and the second horizontal screen magnet 42. The first magnetic assembly 30 and the second magnetic assembly 40 are magnetically match to stable the rotating disc 21 and the base 11 respectively.

Furthermore, the first magnetic assembly 30 includes two first inner magnetic brackets 34 symmetrically arranged around the base shaft hole 111 and are close to the base shaft hole 111 relative to the first outer magnetic bracket 33. Opposite ends of each of the first inner magnetic bracket 34 are respectively fixed to first vertical screen magnet 31 and the first horizontal screen magnet 32. The second magnetic assembly 40 includes two second inner magnetic brackets 44 that are symmetrically arranged around the disc shaft hole 211 and are close to the disc shaft hole 211 relative to the second outer magnetic bracket 43. The second inner magnetic bracket 44 rotates back and forth around the hollow shaft 222 between the two first inner magnetic brackets 34. The opposite ends of the second outer magnetic bracket 43 respectively fix the second vertical screen magnet 41 and the second horizontal screen magnet 42.

In this embodiment, the structure of the first inner magnetic bracket 34 is substantially the same as the structure of the first outer magnetic bracket 33, and the difference is that details are not described herein again. The first inner magnetic bracket 34 and the first outer magnetic bracket 33 are staggered, to increase arrangement positions of the first vertical screen magnet 31 and the first horizontal screen magnet 32 on the rotating disc 21, and to balance limiting force of the first magnetic assembly 30 to the rotating disc 21. The structure of the second inner magnetic bracket 44 is substantially the same as the structure of the second outer magnetic bracket 43, and the difference is that the details are not described herein again. The second inner magnetic bracket 44 and the second outer magnetic bracket 43 are staggered, to increase the arrangement positions of the second vertical screen magnet 41 and the second horizontal screen magnet 42 in the base 11, and to balance the limiting force of the second magnetic assembly 40 to the rotating disc 21. When the first outer magnetic bracket 33 and the second outer magnetic bracket 43 abut with each other, and the first inner magnetic bracket 34 and the second inner magnetic bracket 44 abut with each other, a gap between the first inner magnetic bracket 34 and the second inner magnetic bracket 44 faces a gap between the first outer magnetic bracket 33 and the another second outer magnetic bracket 43.

Figure 7:
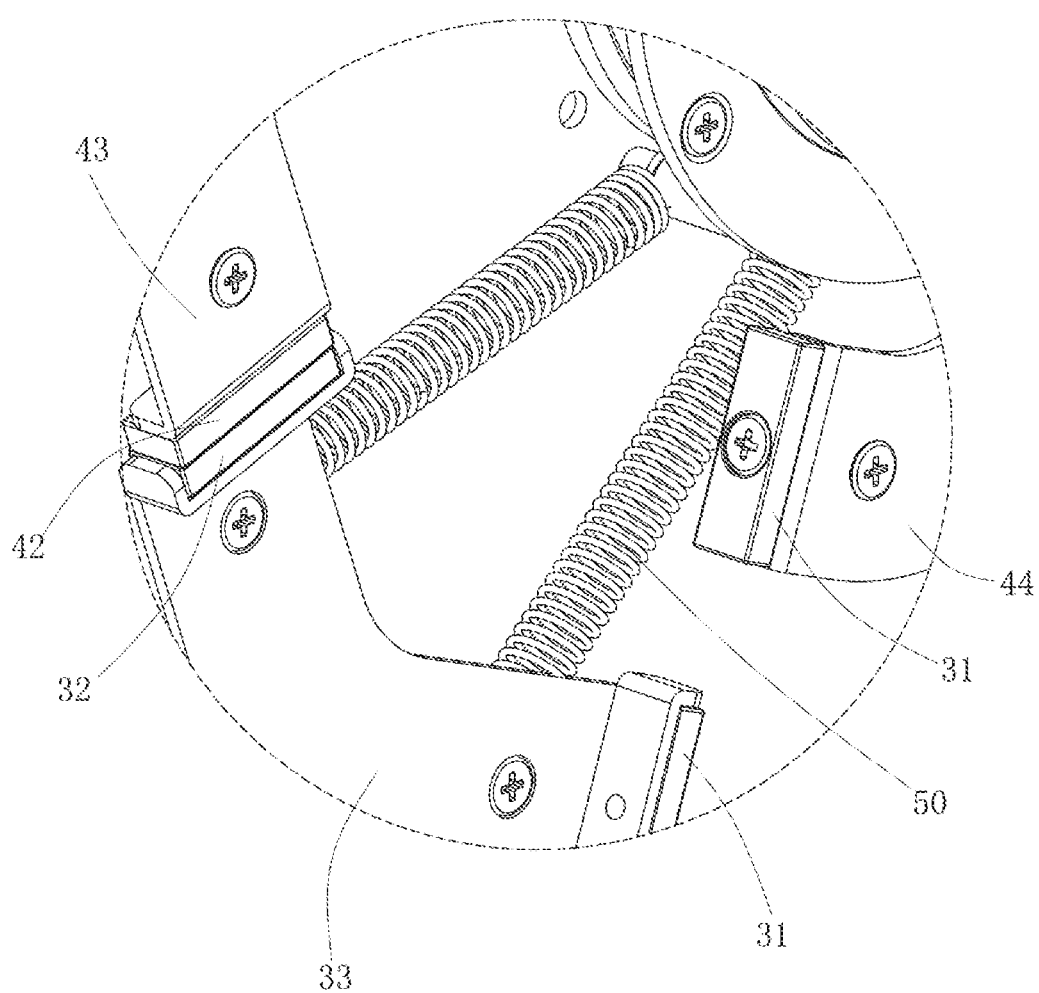
FIG. 7 is an enlarged schematic view of a circle VII of the display mounting apparatus of FIG. 5.
Figure 8:
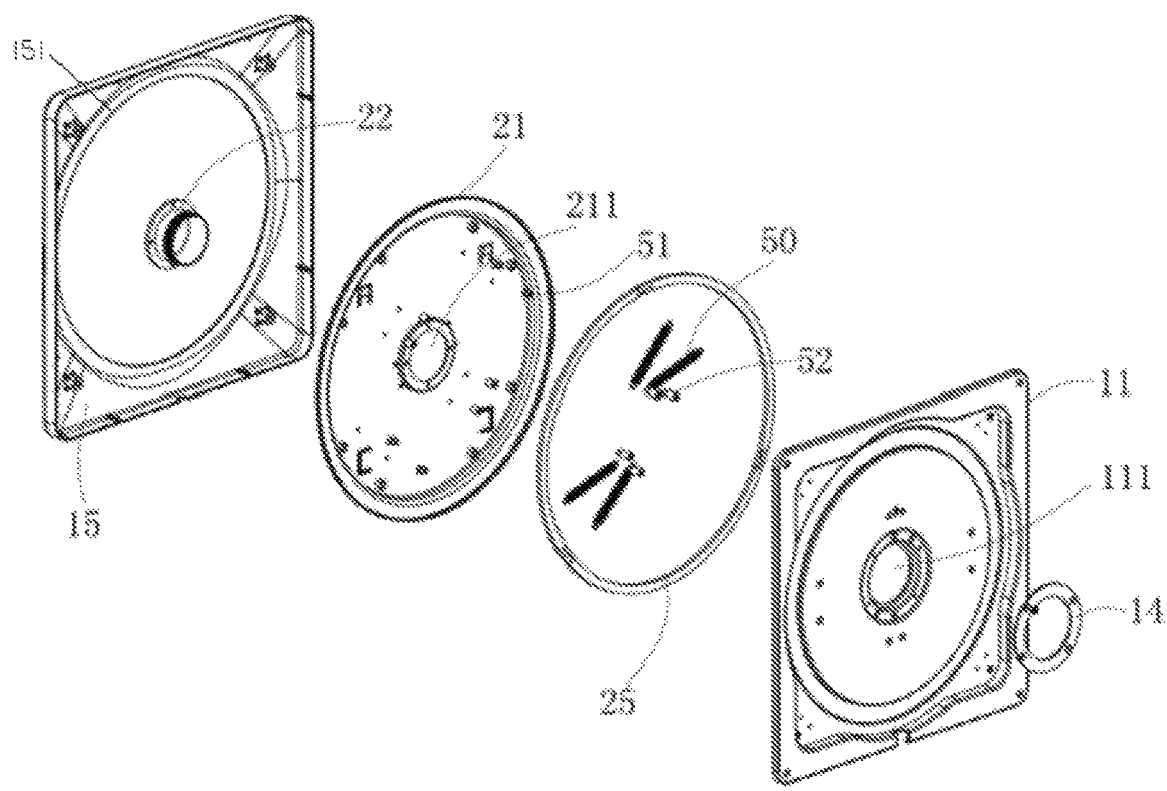
FIG. 8 is another exploded view of a display mounting apparatus provided by the present disclosure.

Furthermore, referring to FIG. 5, FIG. 7, and FIG. 8, the display mounting apparatus 100 further includes an elastic member 50 elastically coupled to the rotating disc 21 and the base 11. One end of the elastic member 50 is fixed to a part of the rotating disc 21 away from the disc shaft hole 211, and the other end of the elastic member 50 is fixed to a part of the base 11 close to the base shaft hole 111. The elastic member 50 is used to provide an elastic restoring force of the first magnetic assembly 30 moving to the second magnetic assembly 40.

In this embodiment, the rotating disc 21 includes a first positioning post 51 away from the disc shaft hole 211, and one end of the elastic member 50 is sleeved on the first positioning post 51. The base 11 includes a second positioning post 52 close to the base shaft hole 111, and the other end of the elastic member 50 away from the first positioning post 51 is sleeved on the second positioning post 52, so that the elastic member 50 is elastically coupled to the rotating disc 21 and the base 11. The elastic member 50 is a rectangular spring. The elastic member 50 is coupled to the rotating disc 21 and the base 11 in an elastically stretched state. When the elastic stretching amount of the elastic member 50 is at a maximum state, the rotating disc 21 drives the first vertical screen magnets 31 to be separated from the second vertical screen magnets 41, and further drives the first horizontal screen magnets 32 to be separated from the second horizontal screen magnets 42, and the rotation angle between the first vertical screen magnets 31 and the second vertical screen magnets 41 is 45°, the rotation angle between the first horizontal screen magnets 32 and the second horizontal screen magnets 42 is 45°, and the elastic force of the elastic member 50 applied to the rotating disc 21 and the base 11 is parallel to a radial direction of the hollow shaft 222, that is, the rotational resistance force of the elastic member 50 to the rotating disc 21 and the base 11 is in a minimum state. When the rotating disc 21 drives the first vertical screen magnets 31 to rotate to a position where a rotation angle between the first vertical screen magnets 31 and the second vertical screen magnets 41 is less than 45°, the elastic force of the elastic member 50 to the rotating disc 21 and the base 11 may assist the rotating disc 21 to rotate relative to the base 11, to assist the first vertical screen magnets 31 each to rotate to a state being magnetically engaged with one second vertical screen magnet 41. Similarly, when the rotating disc 21 drives the first horizontal screen magnets 32 to rotate to a position where a rotation angle between the first horizontal screen magnets 32 and the second horizontal screen magnets 42 is less than 45°, the elastic force of the elastic member 50 to the rotating disc 21 and the base 11 may assist the rotating disc 21 to rotate relative to the base 11, to assist the first horizontal screen magnets 32 each to rotate to a state being magnetically engaged with one second horizontal screen magnet 42.

Furthermore, the display mounting apparatus 100 includes a plurality of elastic members 50, and the plurality of elastic members 50 are symmetrically arranged around the hollow shaft 222.

In this embodiment, the display mounting apparatus 100 includes four elastic members 50. The four elastic members 50 are divided into two groups of elastic members 50 arranged symmetrically around the hollow shaft 222. Each group of elastic members 50 includes two elastic members 50 cooperatively apply force on the rotating disc 21 and the base 11. The four elastic members 50 are symmetrically arranged around the hollow shaft 222, so that the forces of the four elastic members 50 on the rotating disc 21 and the base 11 are evenly arranged to avoid the eccentricity of the rotating disc 21 and the base 11, to ensure the concentricity of the rotating disc 21 and the base 11, and to increase the rotation smoothness of the rotating disc 21 and the base 11.

Figure 9:
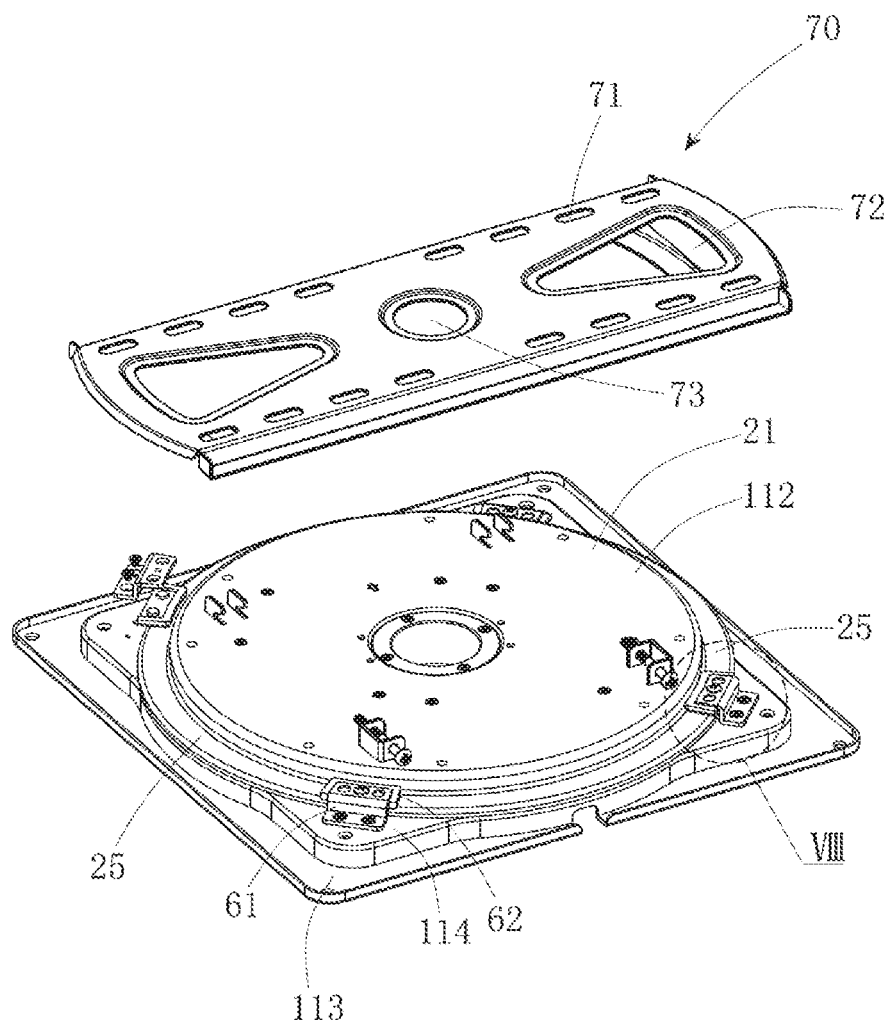
FIG. 9 is another exploded view of a display mounting apparatus provided by the present disclosure.
Figure 10:
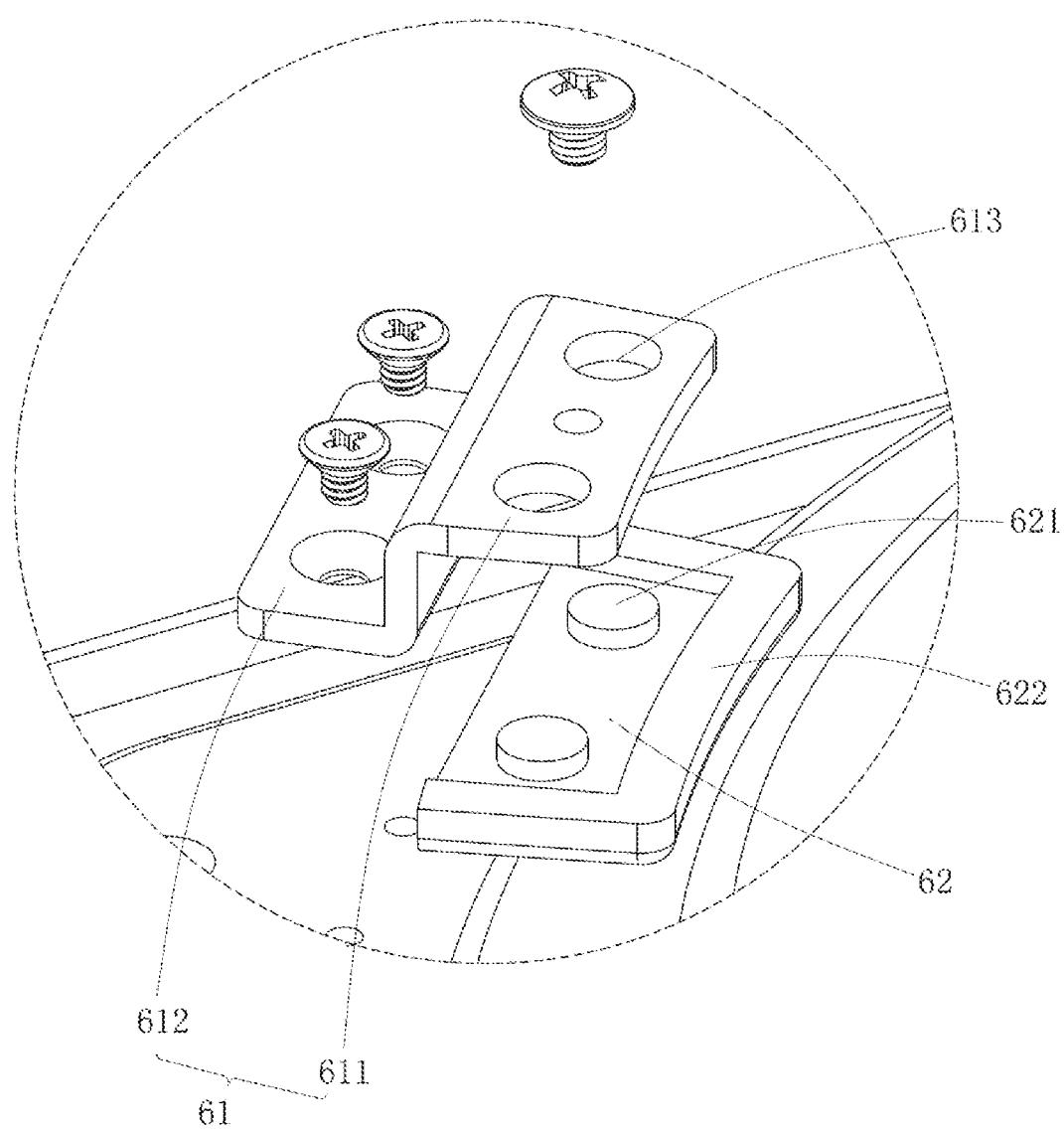
FIG. 10 is an enlarged schematic view of a circle VIII of the display mounting apparatus of FIG. 9.

Furthermore, referring to FIG. 8, FIG. 9, and FIG. 10, the rotating base 10 further includes a plurality of damping adjusting members 61 and a plurality of damping members 62 arranged symmetrically around the base shaft hole 111. Each damping adjusting member 61 includes a pressing piece 611 stacking on the periphery of the rotating disc 21. Each damping member 62 is fixed to one side of the pressing piece 611 facing the rotating disc 21 and frictionally fits the periphery of the rotating disc 21.

In this embodiment, four corners 114 of the stable perimeter 113 are respectively provided with four stable bosses 114 adjacent to the support disc 112. The four damping adjusting members 61 are respectively fixed on the four stable bosses 114. The damping adjusting member 61 is a bent steel plate. The damping adjusting member 61 includes an adjusting piece 612 substantially parallel to the pressing piece 611. The adjusting piece 612 is fixed on the stable boss 114 by screws. By adjusting the tightness of the screws, the tightness of the adjusting piece 612 on the stable boss 114 can be adjusted, so that the distance between the pressing piece 611 and the rotating disc 21 can be fine-tuned, and the fine adjustment of the damping force of the damping member 62 on the rotating disc 21 is further achieved. The damping member 62 abuts against the periphery of the rotating disc 21 under the cover of the pressing piece 611, so as to provide a rotational damping force to the rotating disc 21. The damping member 62 is made of plastic materials. The damping member 62 reduces abrasion of the rotating disc 21 and ensures the service life of the display mounting apparatus 100. Specifically, the pressing piece 611 defines two through holes 613, and the damping member 62 includes two filling portions 621 each engaged with one through hole 613. The damping member 62 further includes a covering edge 622 covering a peripheral side of the pressing piece 611. The damping member 62 and the pressing piece 611 are made of same materials, and the damping member 62 effectively protects the pressing piece 611.

In this embodiment, the rotating support 20 further includes damping rings 25 each fixed to a peripheral edge of the rotating disc 21, and each damping ring 25 is frictionally fitted with the damping member 62. The damping ring 25 is a plastic ring. The frictional fit of the damping ring 25 and the damping member 62 is used to reduce friction loss between the rotating disc 21 and the base 11, thereby further ensuring the service life of the display mounting apparatus 100.

Furthermore, the rotating base 10 further includes a bottom cover 15 covered with the base 11. The bottom cover 15 defines a disc through hole 151. The bottom cover 15 covers the damping adjusting member 61 and the damping member 62. The rotating disc 21 partly passes through the disc through hole 15, so that the rotating disc 21 is coupled to a wall or a support frame. The bottom cover 15 provides protection performance to the rotating base 10 and increases appearance performance of the display mounting apparatus 100 so that the appearance of the display mounting apparatus 100 is concise.

Figure 11:
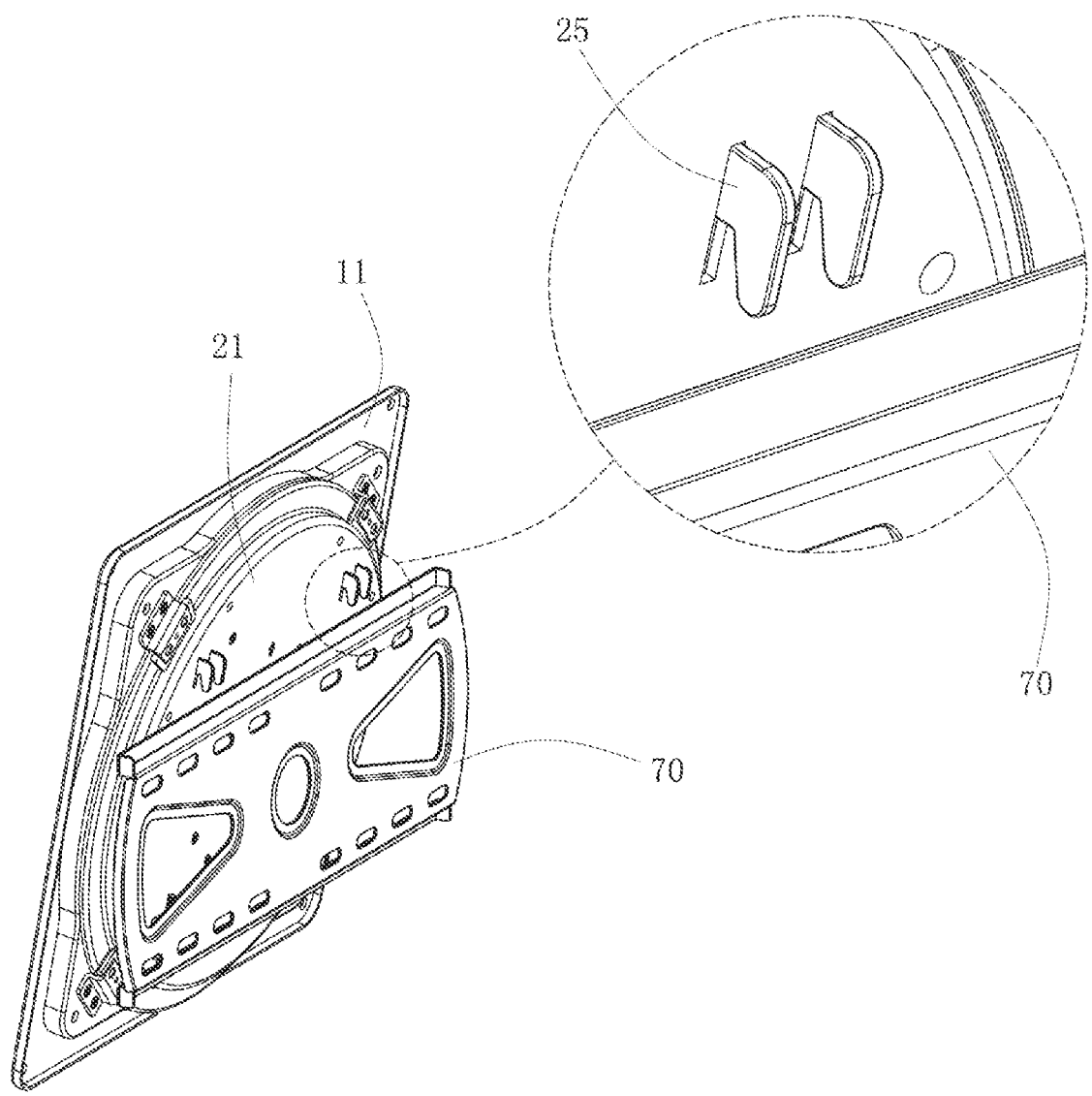
FIG. 11 is a schematic view of disassembly and assembly of a display mounting apparatus provided by the present disclosure.
Figure 12:
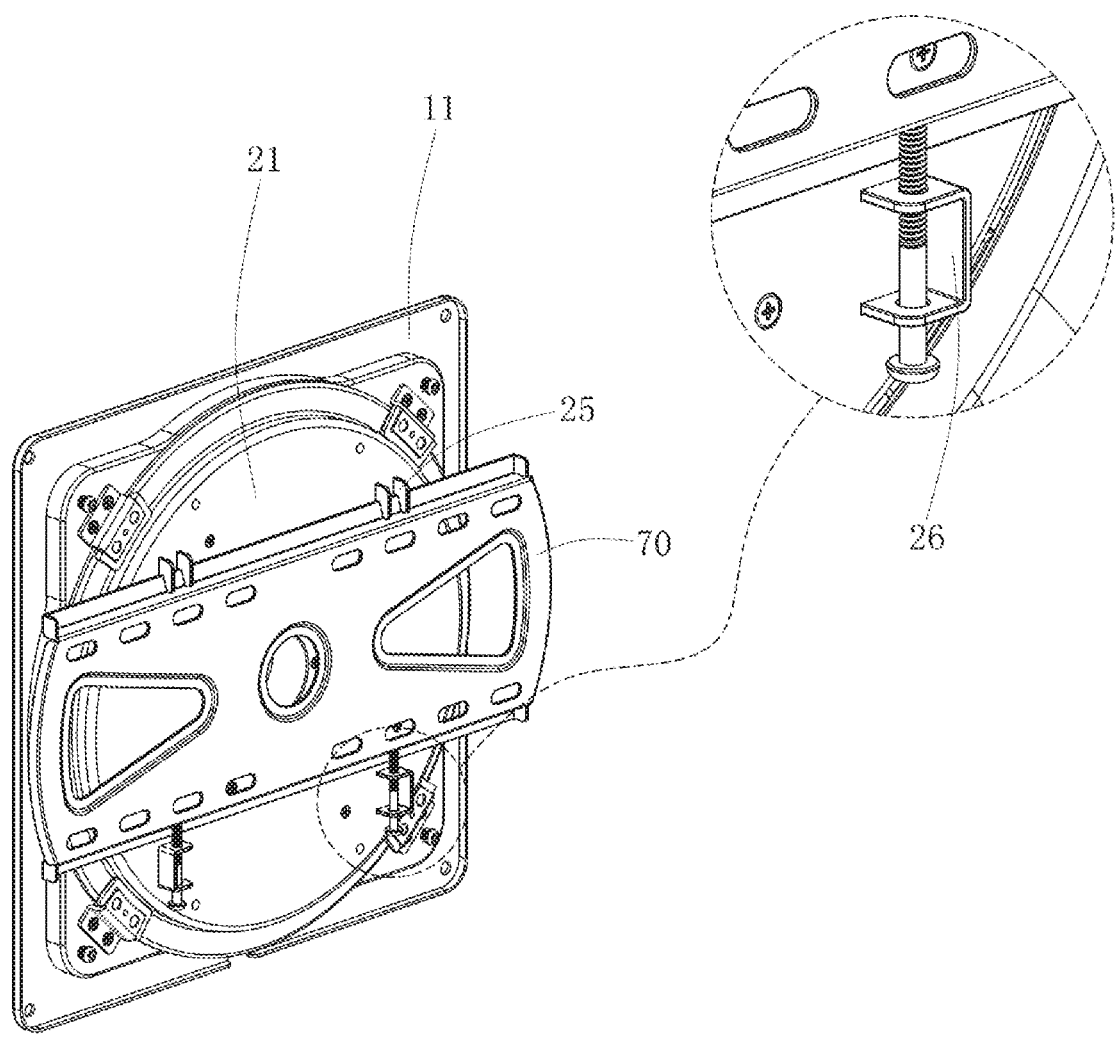
FIG. 12 is another schematic view of disassembly and assembly of a display mounting apparatus provided by the present disclosure.

Furthermore, referring to FIG. 9, FIG. 11, and FIG. 12, the display mounting apparatus 100 further includes a wall plate 70. The wall plate 70 is detachably coupled to a side of the rotating disc 21 away from the base 11.

In this embodiment, the wall plate 70 may be fixed on the wall, or fixed on the wall through a telescopic bracket, so as to adjust the display relative to the wall. The rotating disc 21 can be quickly disassembled and attached to the wall plate 70, so that the display can be quickly disassembled and attached to the wall plate 70. Specifically, the wall plate 70 defines a plurality of mounting holes 71 in the upper and lower rows. The wall plate 70 can be fastened to the wall or bracket with fasteners through the mounting holes 71. The wall plate 70 uses the arrangement positions of the plurality of mounting holes 71 to adapt to a variety of different types of brackets. The wall plate 70 defines two opposite hollow holes 72 between the upper and lower rows of mounting holes 71. The two opposite hollow holes 72 can reduce the weight of the wall plate 70 to reduce the weight of the display mounting apparatus 100 and ensure the rotation smoothness adjustment of the display mounting apparatus 100. The wall plate 70 defines a through hole 73 that is aligned with the inside of the hollow shaft 222. The through hole 73 allows the conductive cables of the display to pass through, to facilitate the display to be mounted on the display mounting apparatus 100, thereby facilitating to provide electric energy and electrical signals to the display, which increases the convenience of installation of the display, and facilitates hiding the conductive cables of the display.

Specifically, one side of the rotating disc 21 away from the base 11 includes two hooks 25 and two adjusting members 26 respectively opposite to the two hooks 25. The two hooks 25 can be mounted on the periphery of the wall plate 70. The two adjustment members 26 can be firmly abutted against the periphery of the wall plate 70 away from the hooks 25. Each adjustment member 26 can be fixed to the periphery of the wall plate 70 by screws. By adjusting the screw tightness of the adjustment members 26, the firm strength of the wall plate 70 between the hooks 25 and the adjustment members 26 can be adjusted.

Figure 13:
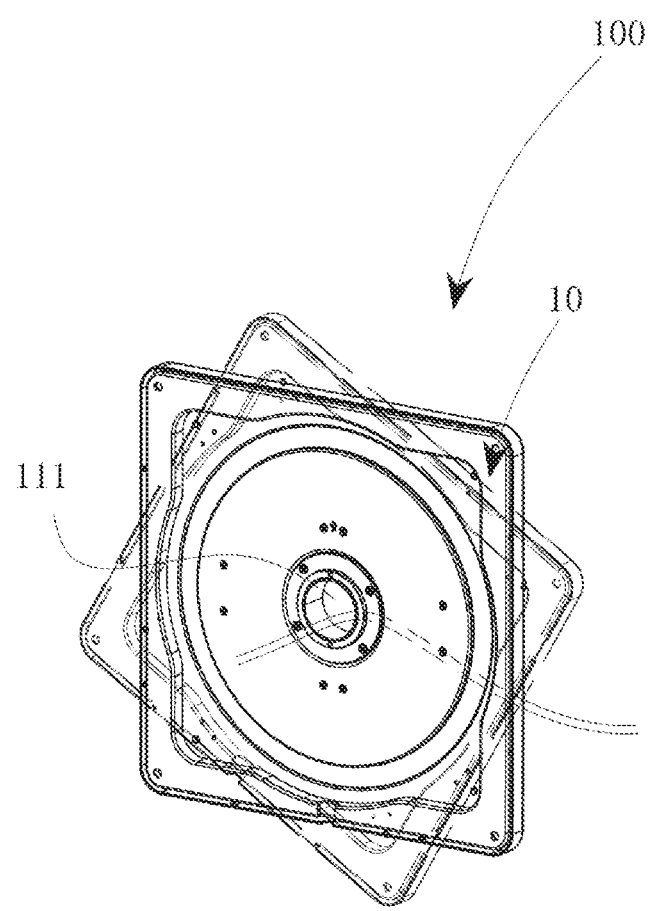
FIG. 13 is a schematic diagram of a rotation of a display mounting apparatus provided by the present disclosure.

Please referring to FIG. 13, in this embodiment, the inside of the base shaft hole 111 of the rotating base 10 can allow the conductive cables of the display to pass through, and the inside of the hollow shaft 222 of the first bearing 22 can allow the conductive cables of the display to pass through, so that the conductive cable of the display can be inserted into the back side of the display mounting apparatus 100, so that the rotating base 10 can drive the display to rotate and adjust the display angle of the display to meet a display's horizontal or vertical display state, but the conductive cables of the display will not interference with the rotation of the display.

Figure 14:
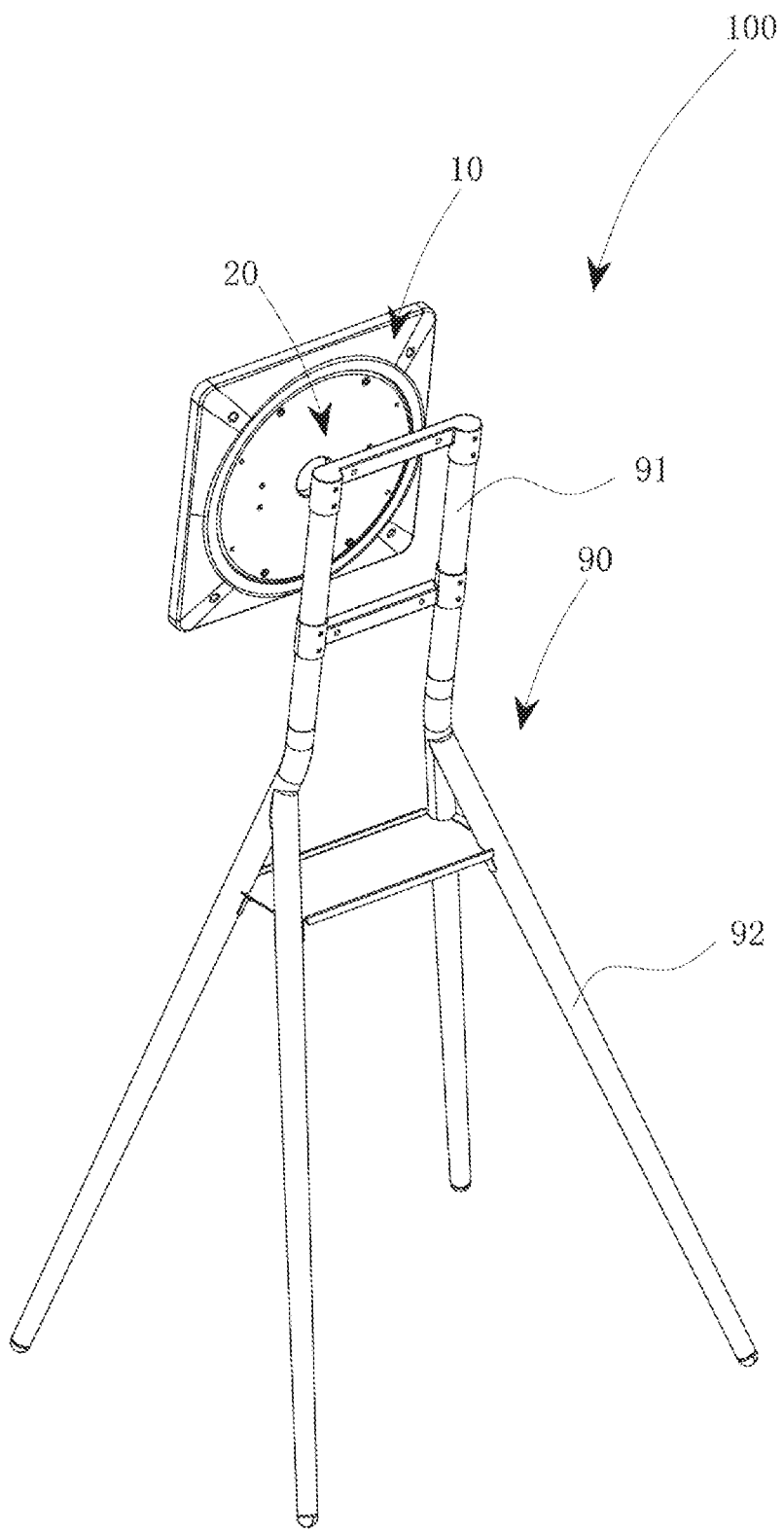
FIG. 14 is another schematic view of disassembly and assembly of the display mounting apparatus provided by the present disclosure.

Referring to FIG. 14, in this embodiment, the display mounting apparatus 100 further includes a stable bracket 90 fixedly coupled to the rotating disc 21. The stable bracket 90 is used to support the rotating disc 21. The fixing bracket 90 includes a fixing frame 91 and four legs 92 supporting the fixing frame 91. Use the stable bracket 90 to support the rotating disc 21 to facilitate the movement of the display mounting apparatus 100, so that the display mounting apparatus 100 can be applied to any occasion; for example, to facilitate the application of the display mounting apparatus 100 and commercial occasions such as conference rooms, supermarkets, and shopping malls. The display mounting apparatus 100 can be moved at will without being restricted by the bearing structure. Of course, it can be understood that the stable bracket 90 can also be replaced with a cart bracket to facilitate the movement of the display mounting apparatus 100.

The first bearing sleeve 22 includes a disc fixed ring 221 fixed to the rotating disc 21 and a hollow shaft 222 passing through the disc shaft hole 211. The second bearing sleeve 23 is fixed to one end of the hollow shaft 222 away from the disc fixed ring 221. The second bearing sleeve 23 and the disc fixed ring 221 cooperatively clamp the at least one base bearing 12. The at least one base bearing 12 engages with the hollow shaft 222, so that the rotating support 20 and the rotating base 10 engage tightly, to improve a rotation stability of rotating disc 21 relative to the base 11.

The present disclosure has been described in detail above. It should be noted that the above embodiments are only used for explaining the technical solutions of the present disclosure, and are not limited thereto; although the present disclosure is described in detail with reference to the foregoing embodiments, those skill in the art should understand that: the scope of the present disclosure is not limited thereto, and any changes or substitutions that can be easily conceived by those skill in the art within the scope of the technical scope of the present disclosure are covered by the scope of the present disclosure. Therefore, the protection scope of the present disclosure is subject to the protection scope of the claims.

What is claimed is:

1. A display mounting apparatus, comprising:
a rotating base and a rotating support, wherein:
the rotating base comprises a base and at least one base bearing, the base defining a base shaft hole, and the at least one base bearing is adapted to the base shaft hole and is coaxial with the base shaft hole;
the rotating support comprises a rotating disc, a first bearing sleeve and a second bearing sleeve;
the base is used to fix a display;
the rotating disc defines a disc shaft hole;
the first bearing sleeve comprises a disc fixed ring and a hollow shaft coaxial with the disc fixed ring and extending from an inside of the disc fixed ring;
the disc fixed ring is fixedly coupled to the rotating disc and is coaxial with the disc shaft hole, the hollow shaft passes through the disc shaft hole, the at least one base bearing and the base shaft hole;
the hollow shaft is adapted to the at least one base bearing;
the second bearing sleeve is fixed to one end of the hollow shaft passing through the base shaft hole; and
the second bearing sleeve and the disc fixed ring cooperatively apply clamping force in a direction parallel to an axial direction of the hollow shaft to the at least one base bearing.

2. The display mounting apparatus according to claim 1, wherein the rotating support further comprises a spacer fixedly coupled to the rotating disc and coaxially disposed with the disc shaft hole, and the spacer and the at least one base bearing are rotatably tightly engaged with each other.

3. The display mounting apparatus according to claim 2, wherein the spacer and the disc fixed ring cooperatively clamp a portion of the rotating disc located on an outer peripheral edge of the disc shaft hole.

4. The display mounting apparatus according to claim 2, wherein, one side of the base away from the rotating disc defines a sink groove that sinks toward the rotating disc along a peripheral side of the base shaft hole, and a bottom of the at least one base bearing is fixed to inside of the sink groove; the rotating base further comprises a bearing pressing piece fixed to the rotating disc; the bearing pressing piece covers one side of the bottom of one of the at least one base bearing away from a bottom of the sink groove.

5. The display mounting apparatus according to claim 4, wherein a portion of the at least one base bearing close to the hollow shaft exposes the sink groove and is clamped between the second bearing sleeve and the spacer, and is rotatably matched with the second bearing sleeve, the spacer and the hollow shaft.

6. The display mounting apparatus according to claim 5, wherein the at least one base bearing comprises a first beam close to the hollow shaft and a second beam away from the hollow shaft, and a vertical beam coupled the first beam to the second beam.

7. The display mounting apparatus according to claim 5, wherein one end of the spacer close to the hollow shaft is rotatably engaged with the at least one base bearing; and there is a gap between one end of the spacer away from the hollow shaft and a portion of the base abutting the at least one base bearing.

8. The display mounting apparatus according to claim 1, further comprising a first magnetic assembly fixed to one side of the base facing the rotating disc, and a second magnetic assembly fixed to one side of the rotating disc facing the base, the first magnetic assembly is magnetically matched with the second magnetic assembly to position the base and the rotating disc and keep the display in a horizontal screen state or a vertical screen state.

9. The display mounting apparatus according to claim 8, wherein the first magnetic assembly comprises first vertical screen magnets and first horizontal screen magnets separated from the first vertical screen magnets; the first vertical screen magnets and the first vertical screen magnets are fixed to the rotating disc; the second magnetic assembly comprises second vertical screen magnets and second horizontal screen magnets adjacent to the second vertical screen magnets; the second vertical screen magnets and the second horizontal screen magnets rotate follow the rotating disc around the hollow shaft between the first vertical screen magnets and the first horizontal screen magnets; when the first horizontal screen magnets and the second horizontal screen magnets are magnetically matched respectively, the display is positioned at the horizontal screen state, when the first vertical screen magnets and the second vertical screen magnets are magnetically matched respectively, the display is positioned at the vertical screen state.

10. The display mounting apparatus according to claim 9, wherein the first magnetic assembly comprises two first outer magnetic brackets arranged symmetrically around the base shaft hole, and opposite ends of each of the two first outer magnetic brackets respectively fix one of first vertical screen magnets and one of the first horizontal screen magnets, and the second magnetic assembly comprises two second outer magnetic brackets symmetrically disposed around the disc shaft hole, and the two second outer magnetic brackets rotate back and forth around the hollow shaft, and opposite two ends of each of the two second outer magnetic brackets respectively fix one of the second vertical screen magnets and one of the second horizontal screen magnets.

11. The display mounting apparatus according to claim 10, wherein the first magnetic assembly comprises two first inner magnetic brackets arranged symmetrically around the base shaft hole and close to the base shaft hole relative to the two first outer magnetic brackets, opposite ends of each of the two first inner magnetic brackets respectively fix one of the first vertical screen magnets and one of the first horizontal screen magnets; the second magnetic assembly comprises two second inner magnetic brackets symmetrically arranged around the disc shaft hole and opposite to the two second outer magnetic brackets and close to the disc shaft hole relative to the two second outer magnetic brackets; each of the two second inner magnetic brackets rotate back and forth around the hollow shaft between the two first inner magnetic brackets; opposite ends of each of the two second outer magnetic brackets respectively fix one of the second vertical screen magnets and one of the second horizontal screen magnets.

12. The display mounting apparatus according to claim 8, wherein the display mounting apparatus further comprises an elastic member elastically coupled to the rotating disc and the base, and one end of the elastic member is fixed to a portion of the rotating disc away from the disc shaft hole, the other end of the elastic member is fixed to a portion of the base close to the base shaft hole, and the elastic member is used to provide an elastic restoring force for the first magnetic assembly to move to match with the second magnetic assembly.

13. The display mounting apparatus according to claim 12, wherein the display mounting apparatus comprises a plurality of elastic members, and the plurality of the elastic members are symmetrically arranged around the hollow shaft.

14. The display mounting apparatus according to claim 1, wherein the rotating base further comprises a plurality of damping adjusting members and a plurality of damping members arranged symmetrically around the base shaft hole, and each damping adjusting member comprises a pressing piece stacking on a periphery of the rotating disc, and each of the damping members is fixed to one side of the pressing piece facing the rotating disc and frictionally fits with the periphery of the rotating disc.

15. The display mounting apparatus according to claim 14, wherein the rotating support further comprises damping rings fixed to the periphery of the rotating disc, and the damping rings each is frictionally matched with one damping member.

16. The display mounting apparatus according to claim 14, wherein the rotating base further comprises a bottom cover engaged with the base, the bottom cover defines a disc through hole, and the bottom cover covers the plurality of damping adjusting members and the plurality of damping members, and wherein one portion of the rotating disc where the display is mounted passes through the disc through hole of the rotating disc.

17. The display mounting apparatus according to claim 1, wherein the display mounting apparatus further comprises a wall plate, and the wall plate is detachably coupled to one side of the rotating disc away from the base.

18. The display mounting apparatus according to claim 17, wherein the wall plate defines a through hole aligned with an inside of the hollow shaft, and the through hole allows conductive cables of the display to pass through.

19. The display mounting apparatus according to claim 17, wherein one side of the rotating disc away from the base comprises two hooks and two adjusting members respectively opposite to the two hooks, and the two hooks are mounted and matched with a periphery of the wall plate, and the two adjusting members are firmly abutted against the periphery of the wall plate away from the hook.

20. The display mounting apparatus according to claim 1, wherein the display mounting apparatus further comprises a stable bracket fixedly coupled to the rotating disc, and the stable bracket is used to support the rotating disc.

\* \* \* \* \*